United States Patent
Glaser et al.

(10) Patent No.: US 6,246,034 B1
(45) Date of Patent: Jun. 12, 2001

(54) MULTI-PERIOD CYCLE-SKIPPING FOR LOW FLICKER, FINE-RESOLUTION POWER CONTROL

(75) Inventors: John Stanley Glaser, Niskayuna; Austars Raymond Schnore, Jr., Scotia, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/432,238

(22) Filed: Nov. 3, 1999

(51) Int. Cl.⁷ ....................................... H05B 1/02
(52) U.S. Cl. .................. 219/501; 219/485; 219/486; 219/452; 219/506; 323/235
(58) Field of Search .................................. 219/497, 483, 219/485, 486, 501, 506, 452; 323/235, 236, 319

(56) References Cited

U.S. PATENT DOCUMENTS

| | | | |
|---|---|---|---|
| 4,340,807 | * | 7/1982 | Raskin et al. ...................... 219/216 |
| 4,400,613 | * | 8/1983 | Popelish ............................. 219/497 |
| 4,404,461 | * | 9/1983 | Sitek et al. ......................... 219/490 |
| 5,079,410 | * | 1/1992 | Payne et al. ....................... 219/506 |
| 5,293,028 | | 3/1994 | Payne . |

OTHER PUBLICATIONS

"Wide Voltage Range Control for an Electric Resistance Heater," John S. Glaser, GE docket RD–27,328, filed concurrently herewith.

"Cycle–Skipping Power Control for AC Line–Powered Loads," John S. Glaser et al., Serial No. 09/366,304 (GE docket RD–26,550), filed Aug. 2, 1999.

* cited by examiner

*Primary Examiner*—Mark Paschall
(74) *Attorney, Agent, or Firm*—Jill M. Breedlove; Douglas E. Stoner

(57) ABSTRACT

A cycle-skipping power control algorithm provides control signal patterns based on generating a number of core patterns corresponding to main power levels and alternating between the core patterns to generate finer control levels. Advantageously, such a cycle-skipping control scheme provides fine power control resolution, and perceptible flicker due to pulsating AC line current is minimized, both in visibly radiant loads and in electric illumination devices in close proximity to the load.

8 Claims, 2 Drawing Sheets

MULTI-PERIOD CYCLE-SKIPPING FOR LOW FLICKER, FINE-RESOLUTION POWER CONTROL

BACKGROUND OF THE INVENTION

The present invention relates to cycle-skipping control for AC line-powered loads, particularly for providing increased control resolution while maintaining low flicker levels at any control setting.

Cycle-skipping control is also known as cycle-stealing control or integral cycle control. As generally used herein, these terms will also refer to ½ cycle control, since it will be understood by those of ordinary skill in the art that an integral cycle control can be modified to provide ½ cycle control.

Cycle-skipping control is often used to control high power electrical loads for which the response time constant is much longer than the period of the AC line used to power the load. An exemplary load is a kitchen range with electrical resistance burners wherein the thermal time constant may be on the order of one second or greater. Cycle-skipping control has the advantage that the power control switch is turned on and off when the load current and voltage are zero. As a result, electromagnetic interference generated by the switching action is essentially eliminated, and electrical stress on the switches is reduced, thereby increasing reliability.

Disadvantageously, however, cycle-skipping control produces pulsating currents in the electrical mains that supply the power to the system. Such current pulses result in voltage fluctuations due to the power source impedance, which may have detrimental effects on other loads connected to the same electrical mains. In particular, if the other loads are used for lighting purposes, for example, visible flicker may result. Such flicker may cause a variety of physical problems for humans, such as headaches and disorientation, or even epileptic seizures in susceptible individuals. Additionally, flicker may cause problems in the controlled load if the controlled load radiates visible light, e.g., as in a radiant electric burner.

Flicker problems in a visibly radiant load usually worsen as finer control resolution is required. Typical cycle-skipping control methods rely on skipping a certain percentage of cycles in a given control period. Hence, as power control resolution is increased, a greater number of cycles is needed in the control period. And as the control period approaches the visual time constant of the load, visible flicker ensues.

Phase control is an alternative type of control method that eliminates the flicker problem described hereinabove, but has the drawback that it inherently generates radio frequency interference and presents a reactive load to the AC line. Steps can be taken to alleviate these problems, but add expense, mass and bulk to the controller. A regulated switch-mode power supply could be used to control load power as well, but this is typically very expensive and thus not practicable.

Accordingly, it is desirable to provide a cycle-skipping control with increased control resolution. It is further desirable that such a cycle-skipping control minimize perceptible flicker in both electrical lighting loads in proximity to the controlled load, as well as in the controlled load itself if the controlled load radiates visible light.

BRIEF SUMMARY OF THE INVENTION

A cycle-skipping power control algorithm provides control signal patterns based on generating a number of core patterns corresponding to main power levels and alternating between the core patterns to generate finer control levels. The core patterns are determined based on control pulse frequency, spacing between the main power levels, overall control bandwidth, and net DC component. Advantageously, such a cycle-skipping control scheme provides fine power control resolution, and perceptible flicker due to pulsating AC line current is minimized, both in visibly radiant loads and in electric illumination devices in close proximity to the load.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The present invention is described herein with particular reference to an electrical resistance heater. However, it is to be understood that the principles of the present invention apply equally to other applications employing cycle-skipping algorithms.

An ideal radiant electric resistance heater would appear to provide a continuous glow. On the other hand, the effects of flicker depend on the amplitude and frequency of the flicker. Human sensitivity has a bandpass characteristic with a maximum in the range from about 6–12 Hz and a peak at about 8.5 Hz.

In practice, the appearance of a continuous radiant heater glow can be obtained if the minimum frequency of power pulses to the heater occur at a rate of about 12 Hz or higher. Control resolution and minimum pulse rate are inversely proportional, so that the maximum resolution that can be obtained for a line frequency of 60 Hz would be about 10% of full power if integral half-cycle skipping is employed. For improved power control accuracy, a resolution of 2% or better is desired, but would likely result in some variation in the heater output. To achieve the smoothest heater appearance, control pulses would need to be evenly spaced, but this would mean that some power levels would cause pulse frequencies in the human sensitivity range of 6–12 Hz. As these frequencies modulate the AC power line, high levels of flicker would be generated in the room lighting. The solution to room lighting flicker is to push the lower frequencies to be much less than 6 Hz, but such lower frequencies would be visible in the heater.

In accordance with preferred embodiments of the present invention, power control signal patterns are provided to optimize the tradeoffs set forth hereinabove. The power control patterns are based on generating core patterns corresponding to main power levels and alternating between the core patterns in order to provide finer control levels. The core patterns are determined based on control pulse frequency, spacing between the main power levels, overall control bandwidth, and net DC component.

Frequency of the control pulses directly affects the perceived flicker level. For the lowest flicker levels, the pulse frequency should be as high as possible. The limit on pulse frequency is determined by the frequency of the AC line because if switching occurred at a frequency greater than that of the AC line, switching would no longer occur at zero-crossings of voltage and current, resulting in losses.

Spacing between the main power levels also directly affects flicker. As the levels get closer, the resolution becomes finer, to the point where the frequency components become lower and more perceptible as flicker, since resolution and pulse frequency are inversely proportional in a cycle-skipping control scheme.

Control bandwidth is a measure of how quickly the power level can be adjusted. Control bandwidth also affects flicker.

Figure 1:
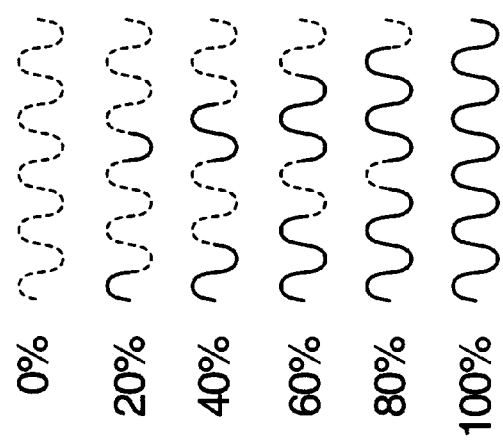
FIG. 1 illustrates exemplary AC line cycle-skipping main-level or core patterns in accordance with one embodiment of the present invention.

FIG. 1 illustrates one exemplary set of core patterns in accordance with one embodiment of the present invention. In particular, the core patterns of FIG. 1 comprise five core levels at 20%, 40%, 60%, 80% and 100%. In FIG. 1, the solid portions of the waveforms represent AC line cycles applied to the heater, i.e., the on-cycles; and the dotted lines represent off-cycles. The five-level core set of FIG. 1 has flicker frequency components at 24 Hz, which are not visible in the heater and which generate low levels of room lighting flicker.

Figure 2:
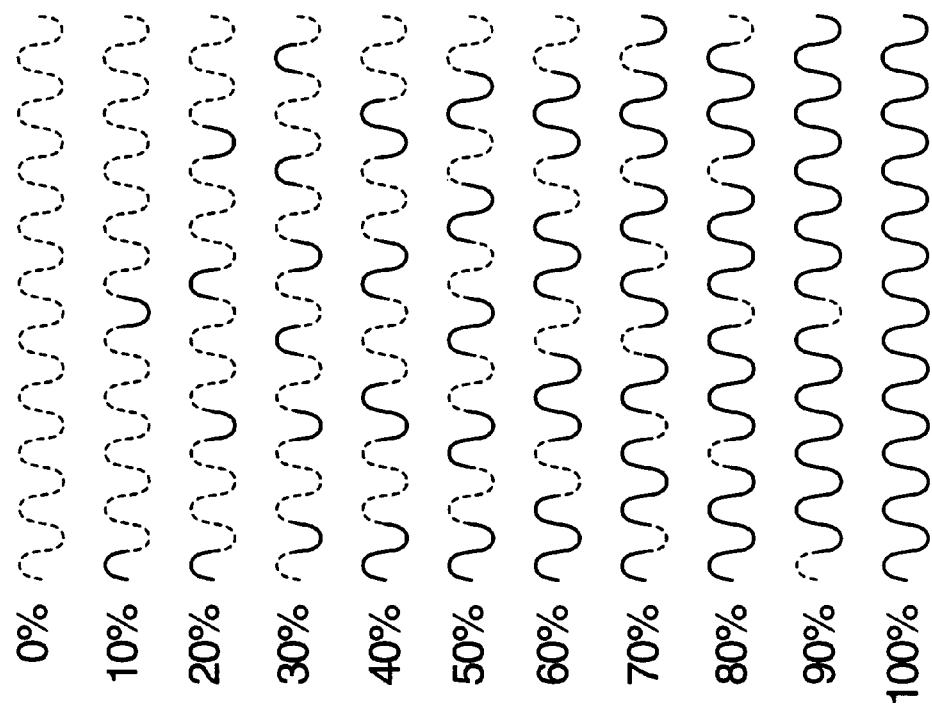
FIG. 2 illustrates other exemplary AC line cycle-skipping main-level or core patterns in accordance with an alternative embodiment of the present invention.

FIG. 2 illustrates another exemplary set of core patterns in accordance with another embodiment of the present invention. In particular, the core patterns of FIG. 2 comprise ten core levels at 10%, 20%, 30%, 40%, 50%, 60%, 70%, 80%, 90% and 100%. The ten-level core set has frequency components at 12 Hz or above, which are unlikely to be visible in the heater itself, but which have the potential to generate moderate to large line flicker levels.

For finer power control, the control alternates between the main levels of the core patterns. One approach involves alternating between main levels on a fixed period basis, the fixed period being referred to as $T_{fine}$. The fixed period $T_{fine}$ is equal to an integer multiple of the main level pattern. Both flicker and control bandwidth drive the value of $T_{fine}$. An exemplary period $T_{fine}$ is 1–2 seconds with $T_{fine}=1$ sec yielding a faster response and a higher flicker than $T_{fine}=2$ sec for one example.

Figure 3:
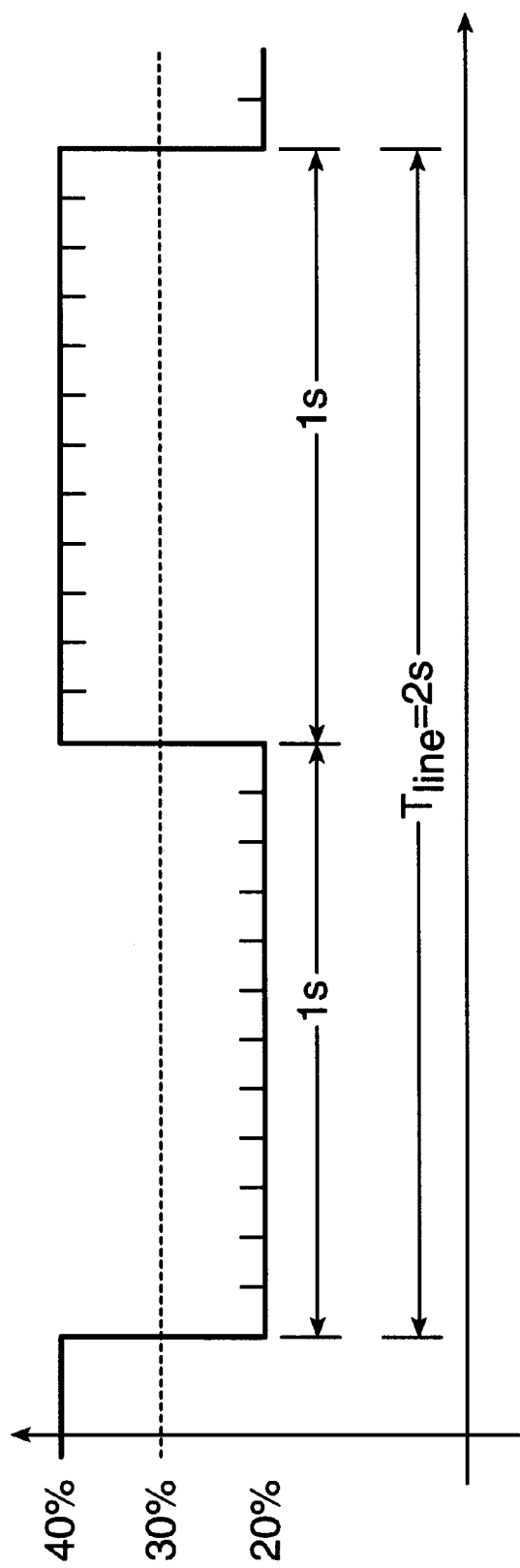
FIG. 3 illustrates finer power control by alternating between main levels.

For example, for the five-level set of core patterns (FIG. 1) and a fine control period $T_{fine}=2$ seconds, 24 patterns can fit within that time period, resulting in 120 levels (not counting the 0% level). In order to generate 30% level control with this scheme, the 20% level could be employed for 1 second and the 40% level for 1 second. FIG. 3 illustrates such a control wherein the small ticks in the graph represent the duration of the main-level patterns shown in FIG. 2. For the example of FIG. 3, there is a low-frequency component of 0.5 Hz in addition to the high-frequency component of the main levels. The lower frequency component will be visible in the heater. Using 10% core levels (FIG. 2) would result in less visible variation than the 20% levels (FIG. 1).

Another alternative is to interleave the different core patterns (e.g., of FIGS. 1 and 2) and to use the minimum number of patterns necessary to generate the needed levels. The result is a smoother heater appearance, but substantially higher line flicker levels.

The core patterns of FIGS. 1 and 2 have no net DC component. This is not a control requirement, but is practical, particularly for applications having moderate to high load power, such as many household appliances. In particular, drawing even a relatively small DC current in household appliances can cause a flux imbalance in the local distribution transformer, causing it to overheat and fail prematurely. Hence, in practice, each core pattern has no DC component, i.e., the same number of positive and negative half-cycles.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for cycle-skipping control for AC line-powered loads, comprising:

providing cycle-skipping control signals comprising preselected patterns having on-cycle portions and off-cycle portions, the patterns comprising a predetermined number of main power levels, the main levels being spaced such that the on-cycle portion for each main level has a control resolution equal to a predetermined percentage of full power depending on the number of main levels, the number and pattern of the main levels being determined by the AC line frequency, spacing of the main power levels, a control bandwidth, and a net DC component in order to produce a flicker component having a frequency above a human peak sensitivity range, the frequency of the control signals having a maximum limit equal to the frequency of the AC line.

2. The method of claim 1 wherein the patterns have no net DC component.

3. The method of claim 1 wherein the patterns comprise five main power levels, the spacing between each level and the control resolution comprising 20% of full power.

4. The method of claim 1 wherein the patterns comprise ten main power levels, the spacing between each level and the control resolution comprising 10% of full power.

5. The method of claim 1 wherein the main levels are spaced substantially evenly.

6. A method for cycle-skipping control for AC line-powered loads, comprising:

providing cycle-skipping control signals comprising preselected patterns having on-cycle portions and off-cycle portions, the patterns comprising a predetermined number of main power levels, the main levels being spaced such that the on-cycle portion for each main level has a control resolution equal to a predetermined percentage of full power depending on the number of main levels, the number and pattern of the main levels being determined by the AC line frequency, spacing of the main power levels, a control bandwidth, and a net DC component in order to produce a flicker component having a frequency above a human peak sensitivity range, the frequency of the control signals having a maximum limit equal to the frequency of the AC line; and alternating between the main levels on a fixed period basis to provide finer control resolution, the fixed period being selected to have a frequency component below the human peak sensitivity range.

7. The method of claim 6 wherein the patterns have no net DC component.

8. The method of claim 6 wherein the main levels are spaced substantially evenly.

* * * * *